United States Patent
Leitinger (10) Patent No.: US 6,834,576 B2
(45) Date of Patent: Dec. 28, 2004

(54) BACON TRIMMER

(75) Inventor: Michael Leitinger, Waukesha, WI (US)

(73) Assignee: Patrick Cudahy, Cudahy, WI (US)

( * ) Notice: Subject to any disclaimer, the term of this patent is extended or adjusted under 35 U.S.C. 154(b) by 7 days.

(21) Appl. No.: 10/206,820

(22) Filed: Jul. 29, 2002

(65) Prior Publication Data

US 2003/0031767 A1 Feb. 13, 2003

Related U.S. Application Data

(62) Division of application No. 09/631,786, filed on Aug. 3, 2000, now Pat. No. 6,426,104.

(51) Int. Cl.[7] .............................................. A22C 17/00
(52) U.S. Cl. ......................... 99/353; 99/355; 99/443 C; 99/537; 83/422; 83/424; 83/435; 83/469; 83/932
(58) Field of Search .......................... 99/352, 353, 355, 99/443 C, 446, 537; 83/401, 422, 424, 435, 469, 932

(56) References Cited

U.S. PATENT DOCUMENTS

| | | | |
|---|---|---|---|
| 1,485,403 A | | 3/1924 | MacDonald et al. |
| 1,825,205 A | * | 9/1931 | Reynoldson ................. 83/422 |
| 2,839,113 A | | 6/1958 | Townsend |
| 3,354,920 A | * | 11/1967 | Hertwig ....................... 83/418 |
| 3,685,561 A | * | 8/1972 | Beasley ....................... 99/589 |
| 3,913,434 A | | 10/1975 | Smithers |
| 3,949,661 A | * | 4/1976 | Greider ....................... 452/127 |
| 3,961,568 A | | 6/1976 | Jeppson ....................... 99/339 |
| 4,112,833 A | | 9/1978 | Oda et al. ..................... 99/425 |
| 4,140,889 A | | 2/1979 | Mason, Jr. et al. ... 219/10.55 E |
| 4,193,272 A | * | 3/1980 | Bernard ....................... 62/320 |
| 4,214,515 A | | 7/1980 | Kubiatowicz ................ 99/400 |
| 4,234,078 A | | 11/1980 | Nott ........................... 198/833 |
| 4,246,837 A | * | 1/1981 | Chenery ...................... 452/134 |
| 4,343,978 A | | 8/1982 | Kubiatowicz ......... 219/10.55 E |
| 4,408,519 A | * | 10/1983 | Schill .......................... 99/486 |
| 4,423,671 A | | 1/1984 | Murphy |
| 4,441,003 A | * | 4/1984 | Eves et al. .................. 219/700 |
| 4,140,889 A | | 5/1988 | Mason, Jr. et al. ... 219/10.55 E |
| 4,786,513 A | | 11/1988 | Monforton et al. ......... 426/107 |
| 4,857,342 A | | 8/1989 | Kappes ....................... 426/107 |
| 4,862,791 A | | 9/1989 | Baughey ...................... 99/400 |
| 4,917,911 A | | 4/1990 | Bush et al. ................. 426/243 |
| 4,920,875 A | * | 5/1990 | Schill .......................... 99/589 |

(List continued on next page.)

Primary Examiner—Drew Becker
(74) Attorney, Agent, or Firm—Hunton & Williams LLP (57) ABSTRACT

A bacon trimmer for trimming cooked bacon slices into substantially uniform lengths comprises: a housing, a transfer comb mounted on the housing, a device mounted on said housing for transferring the cooked bacon slices from a continuous conveyor belt carrying the cooked bacon slices from a cooking device to a first end of said transfer comb, a device for moving the cooked bacon slices across the transfer comb to a second end of the transfer comb and feeding the cooked bacon slices to the same continuous conveyor belt adjacent the second end of said transfer comb, a cutter associated with the housing for trimming the bacon slices into substantially uniform lengths as they are transferred across the transfer comb.

14 Claims, 8 Drawing Sheets

U.S. PATENT DOCUMENTS

| | | | |
|---|---|---|---|
| 4,933,528 A | 6/1990 | Barr | 219/10.55 E |
| 4,950,524 A | 8/1990 | Hacker | 428/163 |
| 4,952,764 A | 8/1990 | Harrington | 219/10.55 E |
| 4,954,356 A | 9/1990 | Kappes | 426/107 |
| 4,957,756 A | 9/1990 | Olander et al. | 426/243 |
| 4,993,112 A | 2/1991 | Burnett et al. | 452/134 |
| 5,012,576 A | 5/1991 | Johannesson | 30/29.5 |
| 5,093,176 A | 3/1992 | Pribonic et al. | 428/76 |
| 5,129,299 A | 7/1992 | Fischer et al. | |
| 5,132,126 A | 7/1992 | Sinkler et al. | 426/241 |
| 5,141,761 A | 8/1992 | Haerr | 426/393 |
| 5,482,166 A * | 1/1996 | Brown | 209/580 |
| 5,520,944 A | 5/1996 | Richardson et al. | 426/438 |
| 5,552,585 A | 9/1996 | Fleck et al. | 219/732 |
| 5,595,776 A | 1/1997 | Selz | |
| 5,611,727 A | 3/1997 | Dufour et al. | |
| 5,637,342 A | 6/1997 | Brooks et al. | 426/523 |
| 5,714,740 A | 2/1998 | Kelly et al. | 219/732 |
| 5,837,979 A | 11/1998 | Fleck et al. | 219/732 |
| 5,997,925 A | 12/1999 | Wilson et al. | 426/332 |
| 6,045,841 A | 4/2000 | Singh et al. | 426/243 |
| 6,634,282 B1 * | 10/2003 | Whitmore | 99/450.1 |

* cited by examiner

BACON TRIMMER

This application is a divisional application of U.S. application Ser. No. 09/631,786, filed Aug. 3, 2000, now U.S. Pat. No. 6,426,104.

FIELD OF THE INVENTION

The present invention relates generally to a bacon trimmer. More particularly, it relates to a bacon trimmer for trimming cooked or pre-cooked bacon slices into substantially equal lengths. The bacon trimmer of the present invention can be readily installed in-line with existing continuous processes for cooking bacon. The present invention further relates to an improved method for preparing cooked bacon slices having a desired, substantially equal length.

BACKGROUND OF THE INVENTION

Continuous manufacturing processes for pre-cooking or cooking bacon are known. Such processes include pressing green pork bellies into a uniform shape and size in a bacon press, and feeding them into a slicer that cuts the bellies into slices. The slices are transferred along a processing direction via a conveyor belt while cure ingredients are applied to the slices. Cure ingredients may be applied, for example, to the slices by immersing them in a cure solution, or by passing the slices through a spray of a cure solution. A conveyor belt feeds the slices into a continuous cooking device where they are cooked for a sufficient time to obtain desired organoleptic properties. Examples of continuous cooking devices include microwave ovens, belt grill ovens, and impingement convection ovens. Generally, microwave oven cooking is preferred because it requires less time to cook the bacon. The cooked bacon slices are transferred via a conveyor belt to a packaging station.

One problem associated with continuous processes for cooking bacon is that the length of the bacon slices is not very uniform. Uniform length is desirable for more efficient packaging and also from the standpoint of consumer appeal. Often, to meet stringent packaging requirements, the cooked bacon slices are trimmed manually to the desired length. This is a labor intensive, slow, and imprecise process.

These and other deficiencies of prior art bacon processing are overcome with the apparatus and method disclosed herein.

SUMMARY OF THE INVENTION

It is an object of the present invention to provide a bacon trimmer for cutting or trimming cooked (or pre-cooked) bacon slices into substantially equal lengths.

It is another object of the present invention to provide a bacon trimmer that is adapted for readily installation into a continuous processes for cooking bacon, such as continuous microwave processes.

It is yet another object of the present invention to provide a bacon trimmer that trims cooked bacon slices into substantially equal lengths, while allowing excess pieces to be saved for processing into other bacon products such as bacon bits for topping.

According to an aspect of the present invention, a bacon trimmer for trimming cooked bacon slices into substantially equal lengths comprises a housing, and a transfer comb mounted on the housing. The bacon trimmer further comprises means mounted on the housing for transferring the cooked bacon slices from a first continuous conveyor belt to a first end of the transfer comb. The transferring means moves the cooked bacon slices across the transfer comb from the first end to a second end, and feeds them to the same or a second conveyor belt adjacent the second end of the transfer comb. Cutting means are mounted on the housing for trimming the bacon slices into substantially equal lengths as they are transferred across the transfer comb. Preferably, excess pieces are saved for other bacon applications, while the trimmed slices are transferred to a packaging station.

The present invention also relates to an advantageous method for making cooked bacon slices having a desired substantially uniform length. The method comprises pressing green pork bellies into substantially uniform shape and size, cutting the pork bellies into slices, cooking the slices in a cooking device, aligning the cooked slices on a conveyor belt, feeding the slices to a bacon trimmer, and trimming the slices to the desired, substantially uniform length.

The present inventive bacon trimmer and method are advantageous, because they allow production of bacon slices with a more exact, uniform length, preferably with less than about 0.25 inches, more preferably less than about 0.10 inches, and most preferably less than about 0.05 inches variance in the length of the slices. Moreover, the bacon trimmer can be readily installed in-line with continuous processes for cooking bacon.

These and other advantages of the present inventive bacon trimmer and method will become more readily apparent to those skilled in the art when the detailed description of the preferred embodiments is read in conjunction with the attached figures.

DETAILED DESCRIPTION OF THE PREFERRED EMBODIMENT

One aspect of the present invention relates to a bacon trimmer comprising a housing and a transfer comb mounted on the housing. The bacon trimmer further comprises means for transferring the bacon slices across the transfer comb, and cutting means for trimming the slices into trimmed slices having a desired, substantially uniform length as they are transferred across the transfer comb.

The housing is preferably mounted on wheels for ease of movement. The housing further includes an inlet and an outlet. A conveyor belt carries the cooked bacon slices from a cooking device through the housing. The housing can be of any suitable shape and is preferably sized to accommodate the conveyor belt.

The transfer comb is preferably made of a metallic or a rigid plastic material such as DELRIN, available from DuPont Chemicals, which is a crystalline polyacetal resin.

The transfer comb has a substantially flat top surface to facilitate transferring the cooked bacon slices and cutting them into trimmed slices. Preferably the transfer comb includes a plurality of longitudinally extending apertures that are sized to allow the excess bacon pieces to fall through the transfer comb and into a pan positioned below the transfer comb. Moreover, the overall shape of the transfer comb and its positioning within the housing are designed to facilitate the transfer of the bacon slices from the conveyor belt onto the first end of the transfer comb and from the second end of the transfer comb back onto the conveyor belt, where the bacon is then carried to a packaging station. For example, the transfer comb may have a substantially rectangular cross-section along a longitudinal axis extending from the first end to the second end of the transfer comb with tapered ends. The angle of the taper of each end may vary, but should preferably be less than about 40°, more preferably from about 10° to about 30°, to facilitate the transfer of the cooked slices to and from the transfer comb.

The bacon trimmer further comprises transferring means, mounted on the housing, that transfers the cooked bacon slices from the conveyor belt carrying the cooked slices from a cooking device to a first end of the transfer comb. The transferring means also moves the bacon slices across the top surface of the transfer comb from the first end to the second end of the transfer comb. The slices are trimmed into substantially equal sizes via the cutting means which are positioned according to one embodiment generally above the transfer comb. Alternatively, the cutting means can be positioned below the transfer comb. The trimmed slices are carried to the second end of the transfer comb and then are fed to the continuous conveyor belt that carries the trimmed slices to a packaging station.

In one embodiment, the conveyor belt that carries the bacon slices from the cooking device is guided through the housing. At the second end of the transfer comb, the conveyor receives the trimmed bacon slices and transfers them to the packaging station. Alternatively, two different conveyor belts may be employed, i.e., a first conveyor belt for transferring the cooked slices from the cooking oven to the first end of the transfer comb and a second conveyor belt for transferring the trimmed slices from the second end of the transfer comb down the line, for further processing or packaging.

In one embodiment, the transferring means includes a plurality of rollers rotatably mounted on the housing and a tractor. The rollers are positioned within the housing in a manner to guide the conveyor belt at close proximity to the first end of the transfer comb, beneath the transfer comb, and then up at close proximity to the other end of the transfer comb. The tractor includes a traction belt arranged in an endless loop that is supported on rotating supporting members which are mounted on the housing. The lower run of the traction belt of the tractor is substantially parallel and sufficiently close to the top surface of the transfer comb to engage the bacon slices and transfer them from the conveyor belt onto the transfer comb, move them across the top surface of the transfer comb to the other end of the transfer comb. Preferably, the traction belt is made from an elastic material such as polypropylene. Also, preferably, the traction belt has an irregular outer surface designed to create sufficient friction between the outer surface and the bacon slices to allow the traction belt to effectively transfer the bacon slices and hold them in place during the trimming action of the cutting means. A preferred traction belt is INTRALOX® belting Series 900 with while diamond top, available by Intralox, Inc., located in Harahan, La. The bacon trimmer may further comprise a gear drive mounted on the housing for transferring motion from the conveyor belt that carries the cooked bacon slices from the cooking device to the tractor. Alternatively, the tractor can be driven by a conventional motor.

Preferably, the cutting means comprise a rotary shaft and at least one pair of cutting heads securely attached to the rotary shaft. The shaft is driven by conventional means such as an electric motor. The cutting heads include at least one cutting member such as a knife or blade, and are positioned in a manner to allow the cutting members to trim the edges of the cooked bacon slices as they are transferred across the top surface of the transfer comb. Preferably, the position of the cutting heads can be adjusted dependent upon the desired length of the trimmed bacon slices. The knives or blades can be of different shapes or sizes. Preferably, the cutting means are positioned generally above the cutting members positioned substantially perpendicularly to the top surface of the transfer comb at either side of the lower run of the traction belt. Preferably, the cutting members may extend into the plane of the top surface of the transfer comb to ensure sufficient contact with the bacon slices. However, other configurations are envisioned, such as, for example, positioning the cutting means below the transfer comb.

Figure 1:
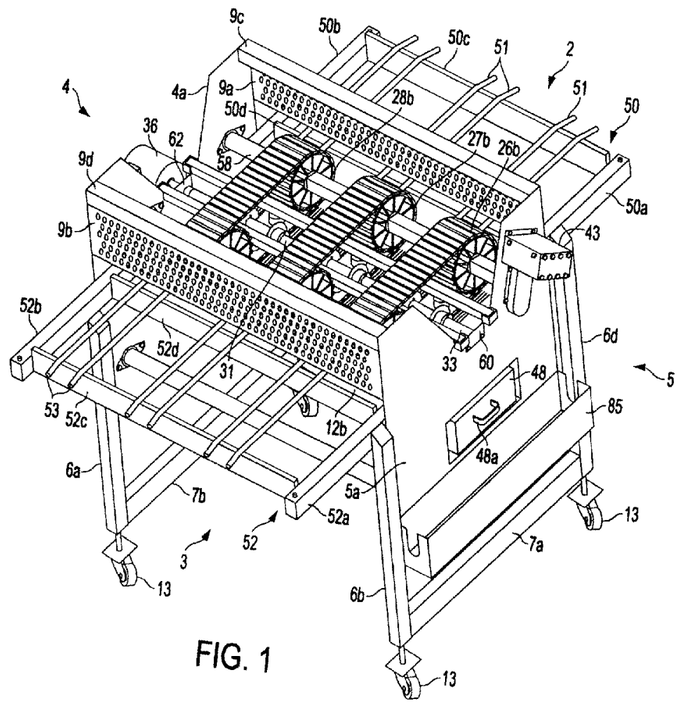
FIG. 1 is a top, perspective view of a bacon trimmer according to a preferred embodiment of the invention.
Figure 2:
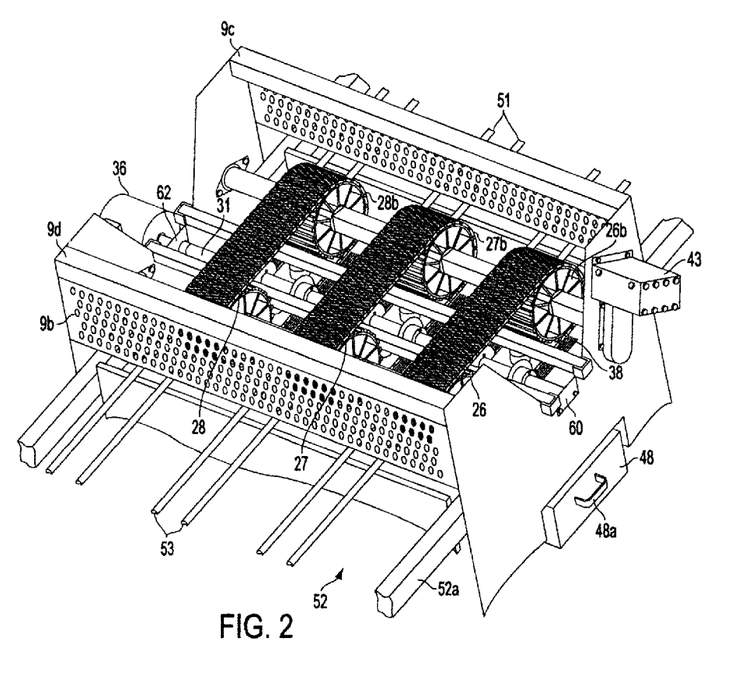
FIG. 2 is a top, partial perspective view of the bacon trimmer of FIG. 1.
Figure 2A:
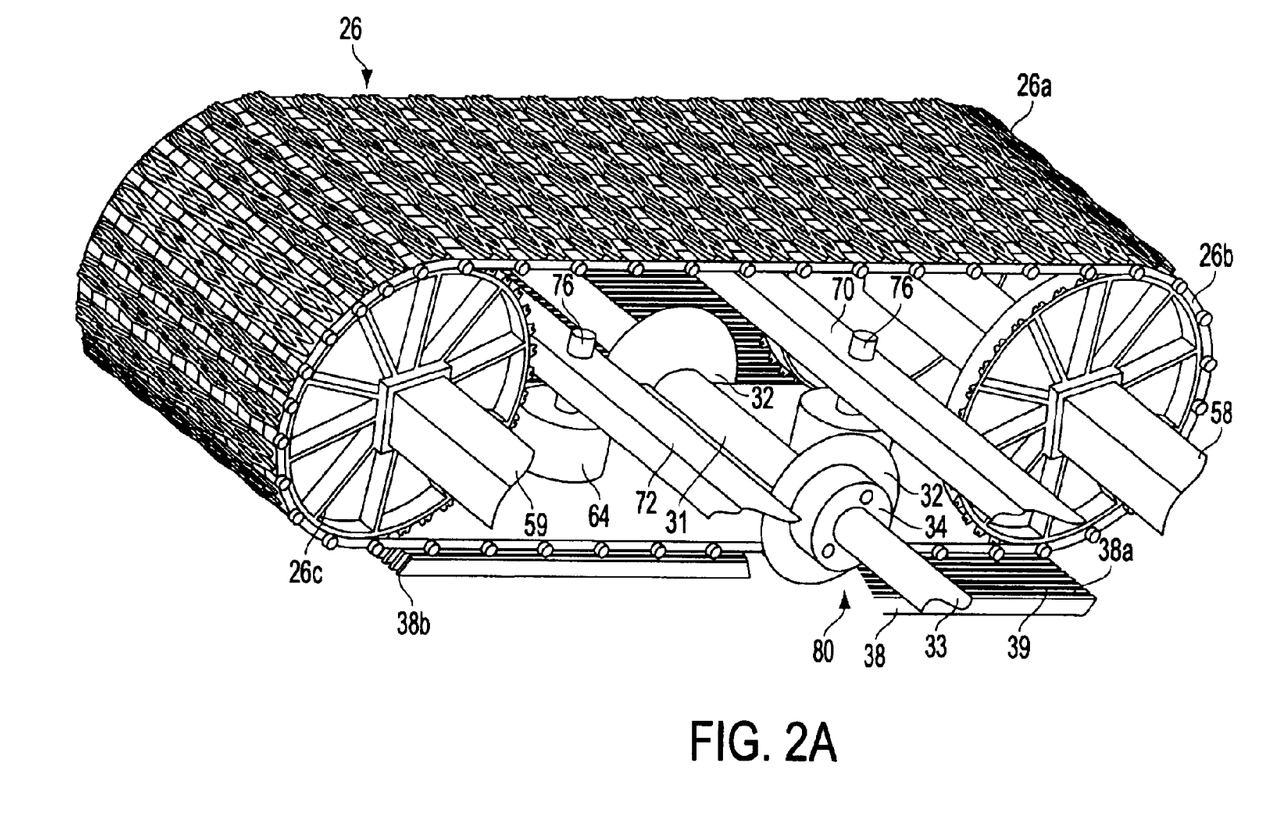
FIG. 2A is an enlarged partial perspective view of the bacon trimmer of FIG. 1 showing the first tractor and transfer comb.

Referring to FIGS. 1–4, a preferred embodiment of the present inventive bacon trimmer is provided. The bacon trimmer, includes a housing 12 of a generally rectangular shape having a front face 2, a back face 3, and two side faces 4, 5. Preferably, the housing is mounted on wheels 13 via a base structure comprising four vertical members or beams 6a, 6b, 6c, and 6d. The base structure further comprises two horizontal beams 7a, and 7b that connect vertical beams 6a, 6c, and 6b, 6d, respectively, for enhanced structural integrity. The top face of the housing 8 is preferably covered by a lid 8a (shown in FIG. 4) for preventing dust or other particulates from falling onto the bacon slices processed inside the housing. FIGS. 1, 2, and 2A show the housing without the lid 8a to reveal the interior parts of the bacon trimmer. Supporting structures or plates 50, 52 are mounted on the front 2 and back face 3 of the housing, respectively, to help support and guide a conveyor belt 20 (FIG. 3) in and out of the housing 12.

Plate 50 includes a pair of longitudinally extending beams 50a and 50b that are connected to vertical beams 6d and 6c, respectively. The plate 50 further includes lateral beams 50c and 50d connected to beams 50a and 50b and a plurality of rods 51 securely attached on top of the lateral beams 50c and 50d. Likewise, plate 52 includes a pair of longitudinally extending beams 52a and 52b that are connected to vertical beams 6a and 6b, respectively. The plate 52 further includes lateral beams 52c and 52d connected to beams 52a and 52b, and a plurality of rods 53 securely attached on top of the lateral beams 52c and 52d. The front face 2 and back face 3 of the housing further include protective screens 9a and 9b, respectively, that include a plurality of apertures for observing the inside of the housing when the top face is covered with lid 8a. Laterally extending beams 9c, and 9d connect side plates 5a and 4a to provide, among other things, additional structural integrity to the housing 12.

The housing 12 further includes an inlet 12a and an outlet 12b (best seen in FIG. 3) formed between the protective screens 9a, 9b and the plates 50, 52, respectively. The inlet 12a and outlet 12b are sized to allow the conveyor belt 20 to pass through the housing 12. The conveyor belt 20 carries cooked bacon slices from a continuous cooking device (not shown) such as a microwave oven.

Figure 3:
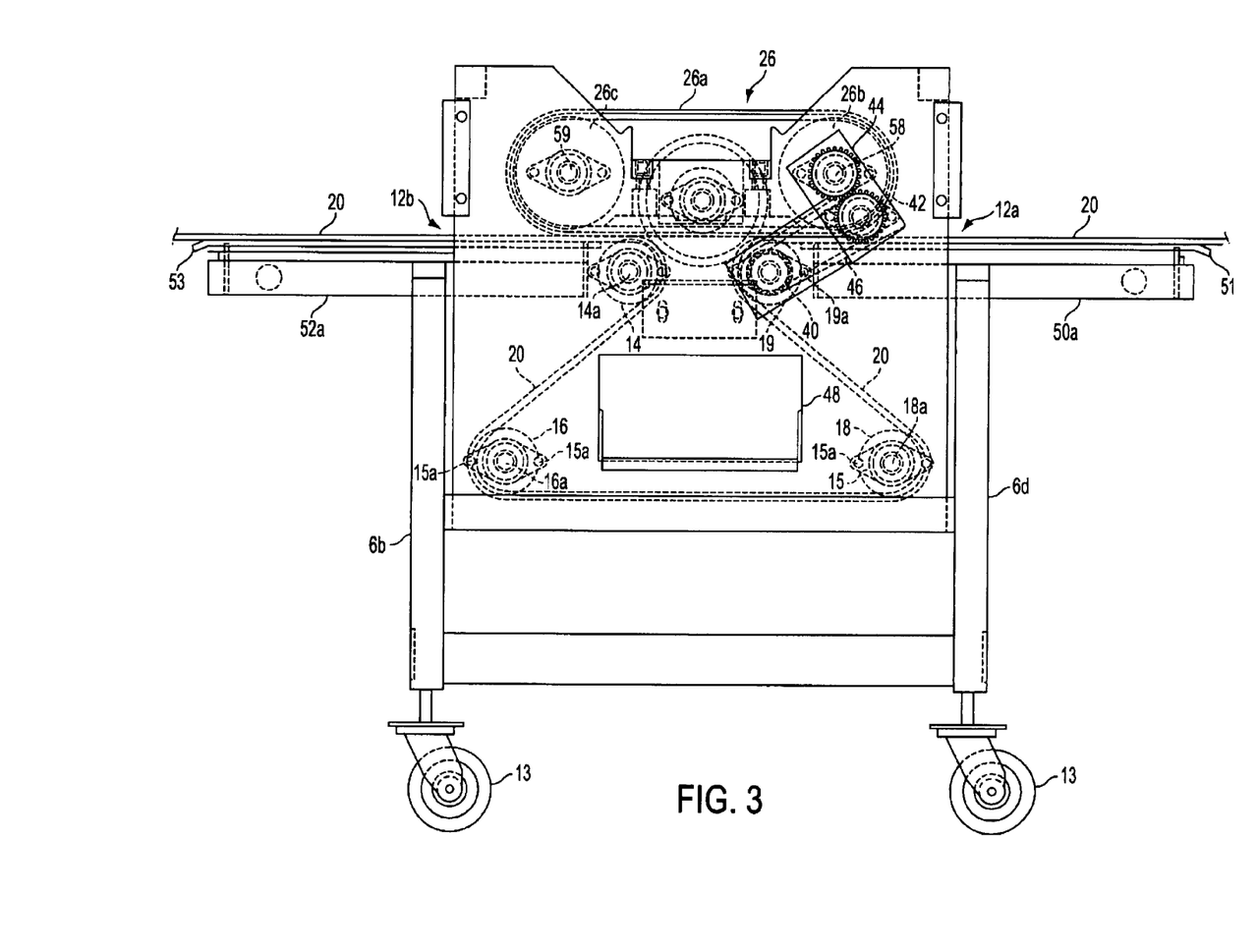
FIG. 3 is a schematic side view of the bacon trimmer of FIG. 1.
Figure 4:
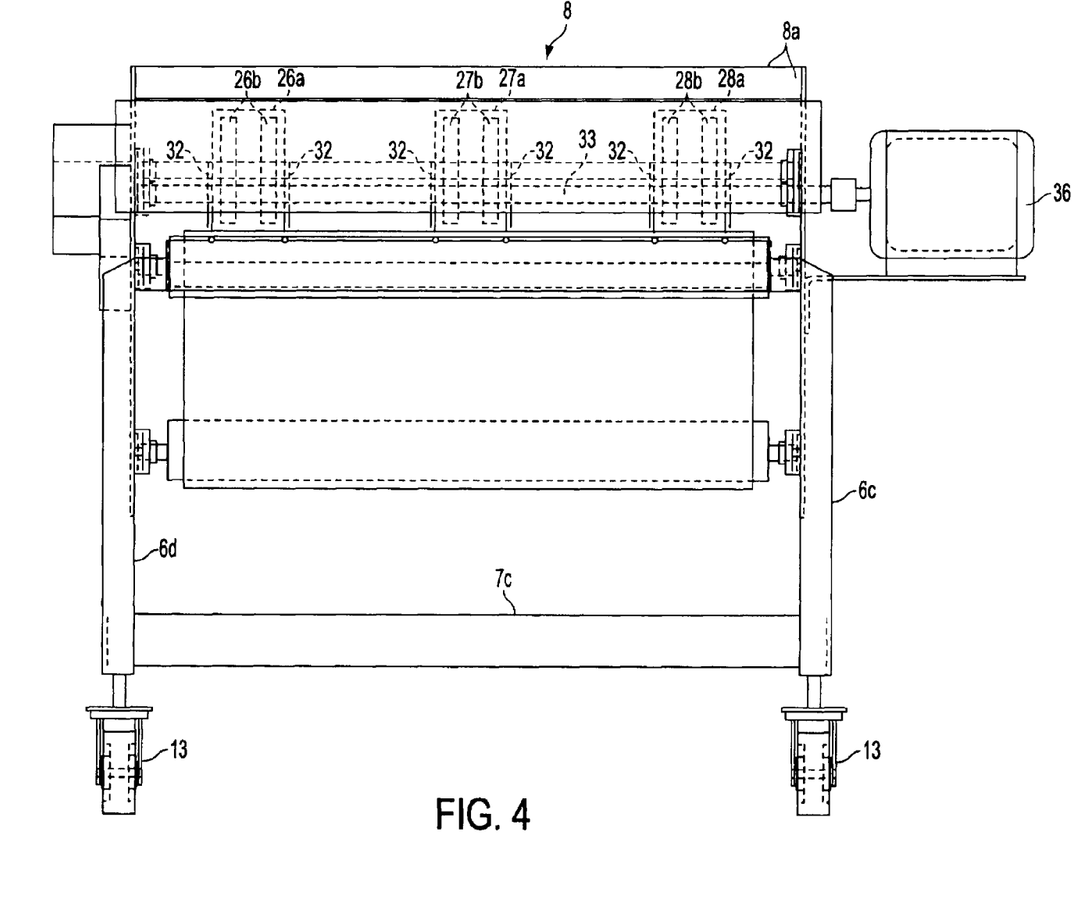
FIG. 4 is a schematic back view of the bacon trimmer of FIG. 1.

The housing 12 further includes other means for supporting and guiding the conveyor belt 20 though the housing 12, such as rollers 14, 16, 18, 19 (best seen in FIG. 3). Roller 19 is connected to a shaft 19a that is rotatably mounted to the housing. Rollers 14, 16 and 18 are rotatably mounted on shafts 14a, 16a, and 18a respectively, which in turn are securely attached to the housing 12 via conventional fastening means, such as bearing plates 15 and bolts 15a. Alternatively, the shafts 14a, 16a and 18a can be welded to the housing. The rollers 14, 16, 18, and 19 in conjunction with plate 50 guide the conveyor belt 20 at close proximity to the first end 38a of the transfer comb 38, then under the transfer comb 38, around rollers 18, 16 and 14, and finally to the other end 38b of the transfer comb 38. Rollers 19 and 14 are positioned to minimize the clearance between the conveyor belt 20 and the ends 38a and 38b of the transfer comb, respectively, to facilitate the transfer of the bacon slices between the conveyor belt 20 and the transfer comb 38.

A sprocket wheel gear 40 is attached to shaft 19a. Sprocket wheel gear 40 is operatively connected to gear 42 through belt 46. Gear 42 is in turn in meshing contact with gear 44, which is in turn mounted on a shaft 58. Gears 40, 42 and 44 form a gear drive 43 (shown in FIG. 1) for transmitting the motion of the conveyor belt 20 to a rotating shaft 58 on which rollers 26b, 27b, and 28b of tractors 26, 27, and 28, are mounted, respectively. The gear drive 43 is positioned outside the housing for ease of maintenance.

The transfer comb 38 is mounted on the housing 12 via conventional mounting means (not shown). For example, the transfer comb can be bolted or welded to the side plates 5a and 4a of the housing. The transfer comb 38 is a metal screen made of stainless steel. It has a plurality of longitudinally extending apertures 39 (FIG. 2A) and a substantially flat top surface that is substantially co-planar with the plane of the top surface of the rods 51 and 53.

Figure 6:
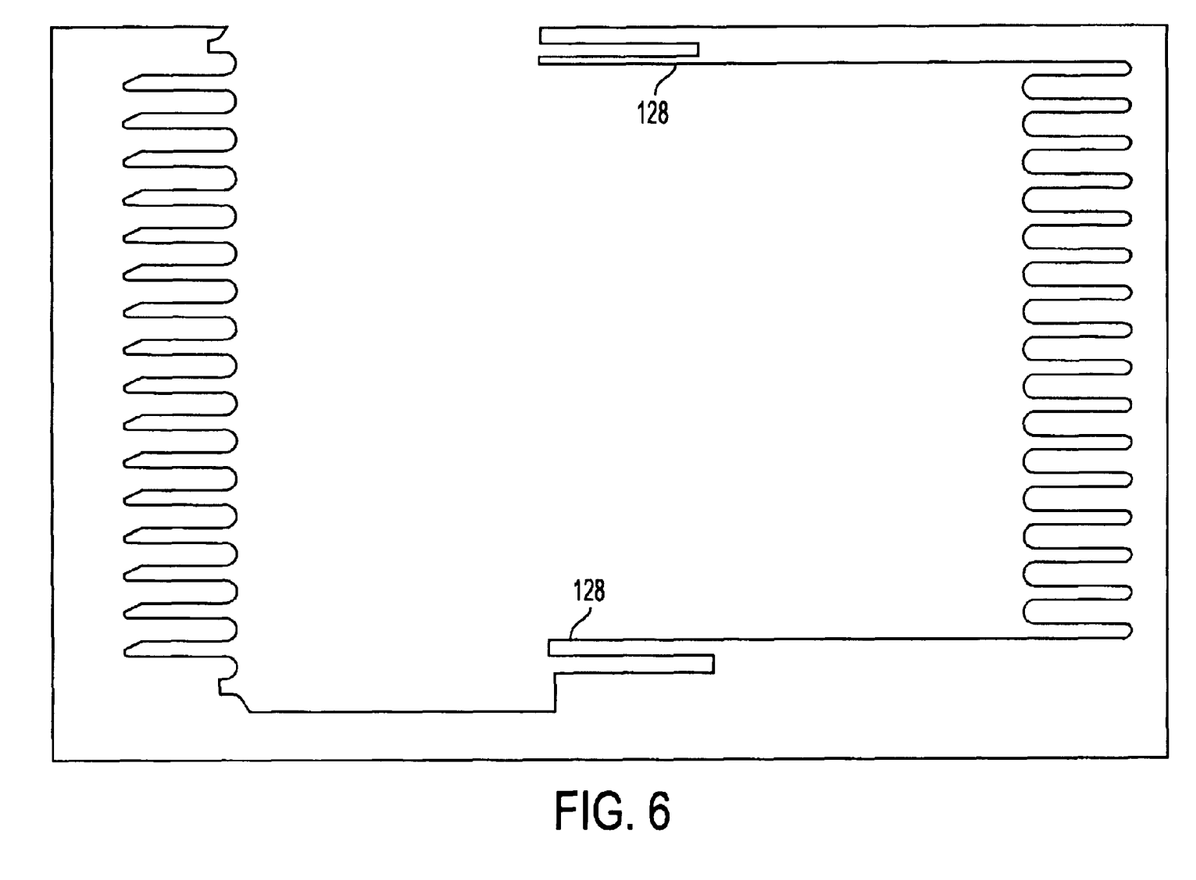
FIG. 6 is a side view of a preferred embodiment of the transfer comb employed in the bacon trimmer of the present invention.
Figure 7:
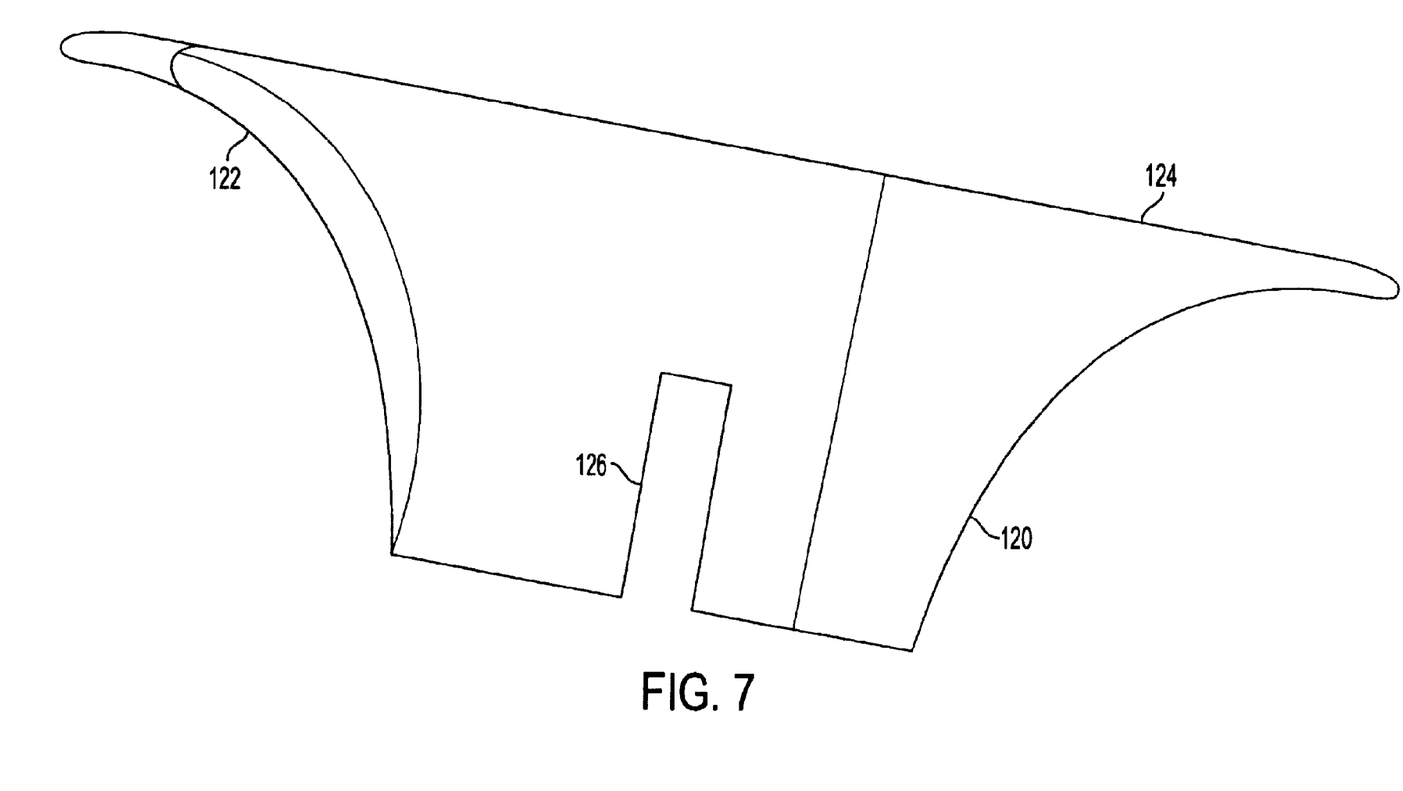
FIG. 7 is a top view of a preferred embodiment of the transfer comb employed in the bacon trimmer of the present invention.

In another embodiment, shown in FIGS. 6 and 7, the transfer comb 38 has a substantially trapezoidal side cross-section with carved sides 120, 122 and a substantially flat top surface 124. The transfer comb 38 of the embodiment FIGS. 6 and 7 includes a notch 126 for securely attaching the transfer comb 38 on a cross member bar (not shown) which is in turn mounted on the housing 12. The cross member bar is preferably made of a stainless steel. As can be seen in FIG. 6 the transfer comb includes slots 128 for receiving the cutting means.

The bacon trimmer of FIGS. 1–4, includes three identical tractors 26, 27, and 28. For example, tractor 26, shown enlarged in FIG. 2A, includes a traction belt 26a arranged in an endless loop supported on two rollers 26b and 26c mounted on rotating shafts 58 and 59, respectively. Tractors 26, 27, and 28 are positioned substantially parallel and sufficiently close to the top surface of the transfer comb 38 to allow the lower run of each traction belt 26a, 27a, and 28a, respectively, to engage the bacon slices which are carried by the conveyor belt 20 in file in rows of three, and transfer them across the top surface of the transfer comb 38, where they are cut into substantially uniform lengths by a cutter 31. Each tractor has a traction belt 26a, 27a, 28a with a width narrower than the desired length of the bacon slices so that the edges of the bacon slices extend beyond the sides of the traction belt. Rotating blades 32 positioned on each side of the traction belt cut the slices at both ends to the desired length. In operation, the tractor belts 26a, 27a, and 28a, pull the bacon strips off the conveyor belt 20, transfer them across comb 38 for cutting and then places them back on the conveyor belt 20.

The cutter 31 includes a rotating shaft 33 that is driven by a conventional motor 36. Three pairs of disk-shaped blades 32 are attached to the rotating shaft 33 through members 34 which are in turn mounted on the shaft 33. The blades 32 are substantially perpendicular to the top surface of the transfer comb. Preferably, the position of the disk-shaped blades 32 can be adjusted by moving members 34 on the shaft.

The shaft 33 of the cutter 31 is rotatably secured on the housing 12 via brackets 60 and 62 that are bolted to the side plates 4a and 5a, respectively. The lower run of each traction belt 26a, 27a, and 28a is urged against the top surface of the transfer comb 38 by a pair of weighted members 64. This causes the bacon slices to be sufficiently extended as they are cut by the disk-shaped blades 32. The members 64 are hanging via support elements 76 from lateral beams 70 and 72, which are in turn removably mounted on brackets 76. Members 64 are preferably threaded for adjusting the pressure exerted on the traction belts. (PLEASE CONFIRM) Thus, the beams 70, 72 can be easily removed and the length of members 64 adjusted by turning members 64 so that they are closer or further away from the beams 70 and 72 to ensure that an effective pressure is exerted against the lower run of each traction belt 26a, 27a, 28a to hold the bacon slices sufficiently extended against the transfer comb 38 while they are being cut. On the other hand, the exerted pressure should not significantly inhibit the motion of the traction belts. Thus, in operation, the lower run of the traction belts transfers the bacon slices across the transfer comb 38 while rotating blades 32, positioned at either side of each traction belt 28a, 28b, and 28c cut the bacon slices at both ends.

The excess pieces fall through openings 80 into a pan 48. Pan 48 can be easily removed via handle 48a. The traction belts 28a, 28b, and 28c transfer the trimmed slices to the end 38b of the transfer comb, and then onto the conveyor belt 20. Conveyor belt 20 transfers the trimmed slices from the bacon trimmer to a packaging station (not shown).

The microwave conveyor belt 20 drives the tractor 26 via gear drive 43 which comprises gears 40, 42 and 44. Gear drive 43 is positioned outside the housing 12 for ease of maintenance. A receptacle 85 is mounted on the side plate 5a for knive storage for cleaning.

The present invention also relates to an improved method for preparing cooked bacon slices having a desired substantially length. One embodiment of the present inventive method comprises pressing green pork bellies into a uniform shape and size using conventional presses, according to block 100 of FIG. 5. The method further comprises feeding the pork bellies to a conventional slicer for cutting the bellies into slices, according to block 102. An example of a conventional slicer that can be used is slicer Model No. HS 640-3, made by Grote. Preferably, the slicer provides slices that have an average length of about 11 inches, and a thickness of about $\frac{1}{16}$ inches. Preferably, the slices fall directly onto a continuously moving conveyor belt that transfers the slices through a curing station, according to block 104. Curing of the bacon slices may be accomplished by any of many well-known conventional means, before, after, or during cooking.

Figure 5:
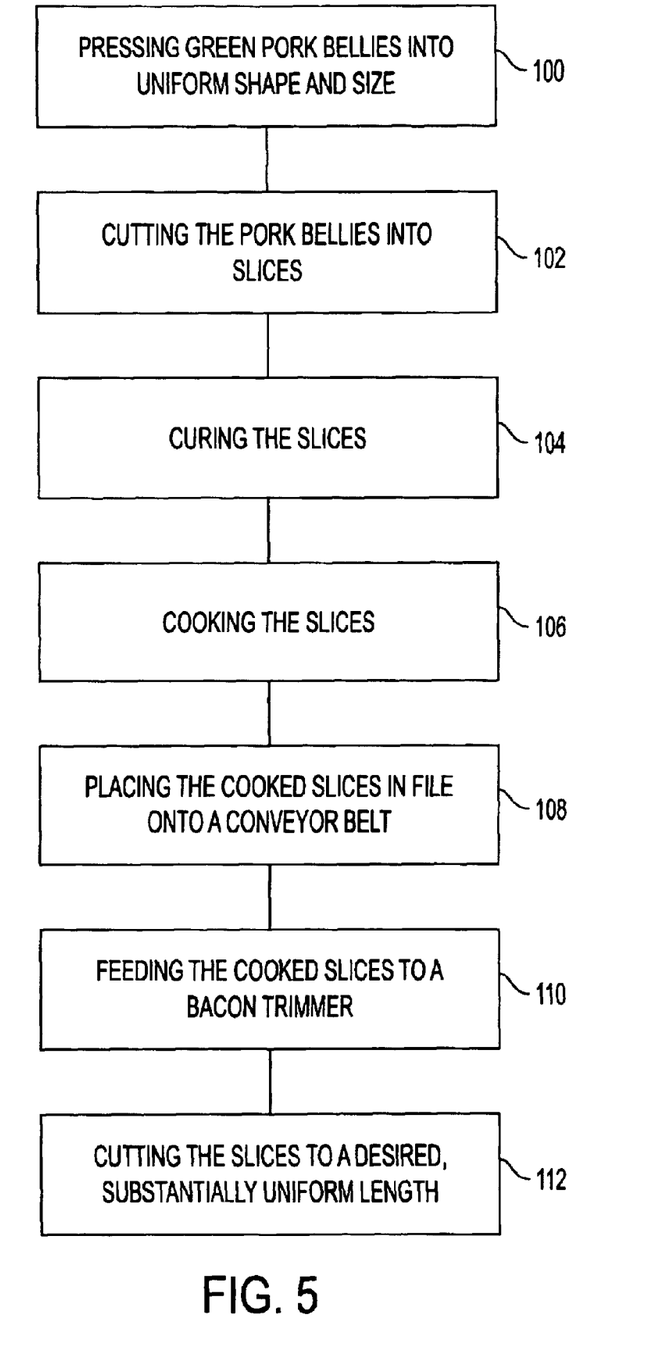
FIG. 5 is a simplified block diagram of a preferred embodiment of the present inventive method.

The method further includes cooking the slices, according to block 106. Preferably, cooking is accomplished in a continuous mode using conventional continuous cooking devices. Preferably, a microwave oven is used, such as Model No. QMP2103 manufactured by Amana, located in Iowa. Examples of continuous manufacturing processes for cooking bacon are described in U.S. Pat. No. 5,999,925 to Wilson et al., which is incorporated herein by reference for all purposes and to the extent that is not inconsistent with the disclosure and claims of the present invention. The present inventive method further includes placing the cooked slices in file onto a conveyor belt, according to step lock 108. The slices are arranged in single file, one behind another, or preferably, in rows of two or three slices per row. The conveyor belt transfers the cooked bacon slices to a bacon trimmer of the present invention according to step 110. However, preferably, the positioning of the slices is done by the Grote slicer. Positioning of the cooked bacon slices in file on the conveyor belt can also be accomplished manually, for example, by an operator placing the cooked bacon slices onto marked areas on a conveyor belt. The bacon trimmer can be sized to accommodate the width of the conveyor belt of various types and sizes of cooking devices. The bacon trimmer can be equipped with one or more tractors or similar transferring means, one for each file or line of bacon slices.

The bacon trimmer cuts the slices to a desired substantially uniform length, according to step 112. The trimmed bacon slices are transferred via the tractor to a conveyor belt that conveys the slices to a packaging station, while the excess pieces fall through the transfer comb into a pan. Preferably, the trimmed bacon slices have a uniform length with a variance or difference between the length of each trimmed slice and the desired length or average length of less than about or 0.25 inches, more preferably less than about 0.10 inches, and most preferably less than about 0.05 inches.

The present invention is not limited to the above mentioned preferred embodiments. Many variations of the present invention can be easily envisioned by those skilled in this art without departing from the scope of the invention as defined in the following claims.

We claim:

1. A bacon trimmer for trimming cooked bacon slices comprising:
   a housing;
   a transfer comb mounted on the housing;
   means mounted on the housing for (i) transferring the cooked bacon slices from a continuous conveyor belt carrying the cooked bacon slices from a cooking device to a first end of said transfer comb, (ii) moving the cooked bacon slices across the transfer comb to a second end of the transfer comb, and (iii) feeding the cooked bacon slices to a continuous conveyor belt adjacent the second end of the transfer comb; and
   cutting means mounted on the housing for trimming the bacon slices transferred across the transfer comb.

2. The bacon trimmer of claim 1, wherein the transfer comb has a substantially flat top surface with a plurality of longitudinally extending apertures sized to allow trimmed bacon bits to fall through the transfer comb into a pan positioned below the cutting means.

3. The bacon trimmer of claim 1, wherein the transferring means include;
   a plurality of rollers for guiding the first continuous conveyor belt through the housing at close proximity to the first end of the transfer comb to feed the bacon slices to said transfer comb; and
   a tractor comprising a traction belt, the tractor being positioned to engage the bacon slices on the conveyor belt, transfer the bacon slices to the first end of the transfer comb, move the bacon slices across the transfer comb to the second end of the transfer comb, and feed the bacon slices to the same conveyor belt adjacent the second end of the transfer comb.

4. The bacon trimmer of claim 1, further comprising a gear drive mounted on the housing for transferring motion from the first conveyor belt to the transferring means.

5. A bacon trimmer for trimming cooked bacon slices comprising:
   a housing;
   a transfer comb mounted on the housing and having a substantially flat top surface;
   means mounted on the housing for feeding the cooked bacon slices from a first continuous conveyor belt carrying the cooked slices to a first end of the transfer comb;
   means for moving the cooked bacon slices across the top surface of the transfer comb and feeding the bacon slices to a second continuous conveyor belt; and
   cutting means mounted on the housing for trimming the bacon slices to predetermined lengths as the bacon slices are transferred across the top surface of the transfer comb.

6. The bacon trimmer of claim 5, wherein the first and second continuous conveyor belt comprise one continuous belt.

7. The bacon trimmer of claim 5, wherein the feeding means include;
   a plurality of rollers for guiding the first continuous conveyor belt through the housing at close proximity to and beneath the first end of the transfer comb; and
   a tractor comprising a traction belt positioned to engage the bacon slices and transfer the bacon slices to the top surface of the transfer comb.

8. The bacon trimmer of claim 7, further comprising a gear drive mounted on the housing for transferring motion from the first conveyor belt to the tractor.

9. A bacon trimmer for cutting cooked bacon slices from a microwave oven comprising:
   a housing having an inlet and an outlet and means for guiding a conveyor belt carrying the cooked bacon slices from a cooking device through the housing;
   a transfer comb mounted on the housing having a substantially flat top surface, a first end near the inlet and a second end near the outlet, the top surface of the transfer comb being substantially co-planar to the inlet and the outlet and having a plurality of longitudinally extending openings;
   a tractor comprising a traction belt arranged in an endless loop supported on at least two supporting members mounted on the housing, the traction belt having an upper run and a lower run and being positioned to allow the lower run of the traction belt to engage the cooked bacon slices at the vicinity of the first end of the transfer comb and transfer them across the top surface of the transfer comb to the second end of the transfer comb;
   cutting means rotatably attached to the housing positioned to cut both ends of the cooked bacon slices to form exact size cooked bacon slices as they are transferred by the lower run of the traction belt across the top surface of the transfer comb.

10. The bacon slicer of claim 9 further comprising a gear drive mounted on said housing for transferring motion from the conveyor belt to the tractor.

11. The bacon slicer of claim 10 wherein said supporting means for supporting the conveyor belt include a plurality of rollers, each said roller being rotatably attached to shaft securely mounted on said housing and wherein at least one of said rollers is connected to said gear drive for transferring the motion of the conveyor belt to said tractor.

12. The bacon slicer of claim 9 wherein said cutting means include a pair of disk-shaped cutters mounted on a rotating shaft that is moved by a motor, one cutter at either side of the lower run of the traction belt.

13. The bacon slicer of claim 9 further comprising a catch pan for catching the excess pieces.

14. A bacon trimmer for trimming cooked bacon slices comprising:

a housing;

a transfer comb mounted on the housing;

means mounted on the housing for transferring the cooked bacon slices from a continuous conveyor belt carrying the cooked bacon slices from a cooking device to a first end of the transfer comb, moving the cooked bacon slices across the transfer comb to a second end of the transfer comb and feeding the cooked bacon slices to the same continuous conveyor belt adjacent the second end of the transfer comb;

cutting means mounted to the housing for trimming the bacon slices into predetermined lengths as they are transferred across the transfer comb.

* * * * *